May 12, 1925.  1,537,908

J. WILLMANN

HEATING AND COOLING APPARATUS

Filed April 18, 1922.

Inventor
Joseph Willmann

Patented May 12, 1925.

1,537,908

UNITED STATES PATENT OFFICE.

JOSEPH WILLMANN, OF DERBY, CONNECTICUT.

HEATING AND COOLING APPARATUS.

Application filed April 18, 1922. Serial No. 554,586.

*To all whom it may concern:*

Be it known that I, JOSEPH WILLMANN, a citizen of the United States, residing at Derby, in the county of New Haven and State of Connecticut, have invented new and useful Improvements in Heating and Cooling Apparatus, of which the following is a specification.

The present invention relates to apparatus constructed to effect interchange or transference of heat between a substance or body of material and a cooling or heating medium and it is applicable more particularly to ice cream freezers, pasteurizers and other apparatus wherein the liquid or substance to be cooled or heated is contained in a cylinder or other receptacle and the cooling or heating action is effected by circulating a cooling or heating fluid or other medium around the cylinder.

In order to produce rapid and efficient interchange of heat between the liquid or substance to be cooled or heated and the circulating medium, it is necessary not only to circulate such medium rapidly in a stream of relatively small cross section, but it is also necessary to locate such stream at a minimum distance from the substance or material in the cylinder and to thus secure maximum thermal conductivity between such substance or material and the circulating medium. The primary object of the present invention is to provide a novel and improved construction whereby greatly increased thermal efficiency in the interchange of heat in apparatus of the kinds referred to, is attained, in comparison with constructions heretofore used for the purpose, and furthermore to provide a construction of this character which can be manufactured with facility and which possesses ample strength to withstand the stresses and strains which exist under the working conditions incident to the operation of apparatus of this character and which tend to cause leakage or other deterioration thereof.

To these and other ends, the invention consists in certain improvements and combinations and arrangements of parts, all as will be hereinafter more fully described, the features of novelty being pointed out particularly in the claims at the end of the specification.

In the accompanying drawing:—

Figure 1:
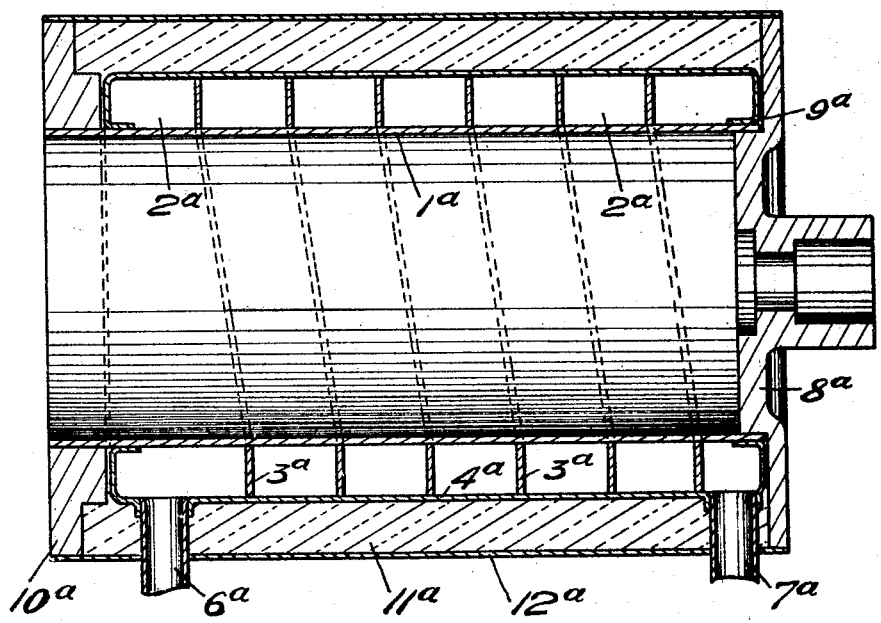
Figure 2:
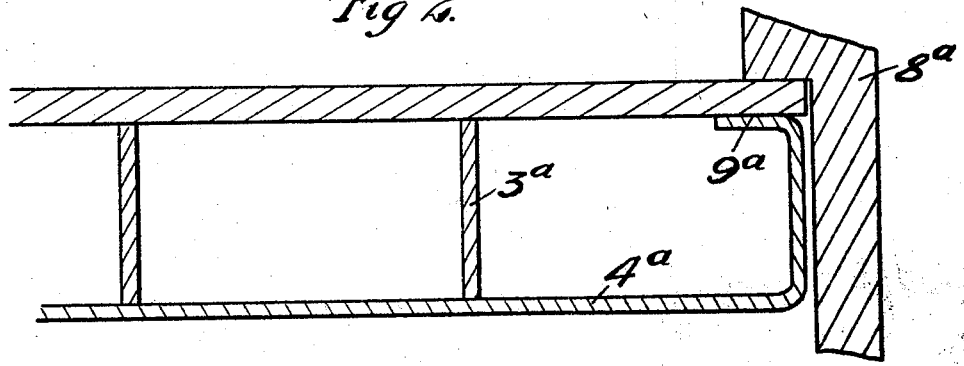

Figure 1 represents a section taken axially through an ice cream freezer, the same being constructed in accordance with the preferred embodiment of the present invention; and Figure 2 represents a detail section, on an enlarged scale, showing the manner of constructing the jacket for the circulating medium and the association of this jacket with the cylinder or receptacle for the substance or material to be treated.

The present invention is applicable generally to all apparatus adapted or intended to effect rapid and efficient interchange of heat between a body of material and a heating or cooling medium. The invention is shown in the accompanying drawing and will be hereinafter described in detail as applied to ice cream freezers, for the purpose of cooling or freezing an ice cream mixture, but the invention is applicable to various kinds of apparatus, irrespective of whether the circulating medium absorbs heat from or transmits heat to the body of material under treatment. The preferred embodiment of the invention is herein shown and described, but it is to be understood that the invention is not restricted to the precise construction shown, as equivalent constructions are contemplated and these will be included within the scope of the claims.

In the present instance, the construction embodies a receptacle $1^a$ which is preferably cylindrical in form and corresponds to the cylinder of an ordinary ice cream freezer of the type employing brine as a cooling medium. This receptacle or cylinder is adapted to contain the ice cream mixture or material to be cooled or frozen, and it is surrounded by a jacket $2^a$ through which the brine or cooling medium is adapted to circulate.

This jacket, according to the present invention, comprises a helix formed by convoluting a flat strip $3^a$ of suitable material preferably non-corrosive metal, such as copper. This strip may be convoluted before it is applied to the cylinder, the inside diameter of the convoluted strip conforming closely with the outside diameter of the cylinder, and when this strip is applied to the cylinder, the spaces between the convolutions of the strip are made uniform and the inner edge of the strip is brazed, welded or otherwise suitably united with the wall of the cylinder. The jacket is completed by folding or wrapping a casing $4^a$ around the convoluted strip and securing this casing so that it will close the jacket around its circumference and its ends, the ends of the casing 4ª being brazed, welded or otherwise united with the peripheral portion of the respective ends of the cylinder, as indicated at 9ª. The inlet 6ª for the circulating medium may be connected to the jacket toward one end thereof and an outlet 7ª may be connected at or toward the opposite end thereof, and the cylinder may be secured at one end to a head 8ª and at its opposite end to a ring-like head 10ª, in the manner shown. By closely fitting the casing 4ª on the convoluted strip 3ª, contact will be produced and maintained between the casing and the outer edge of the strip 3ª, thus preventing short-circuiting of the circulating medium. The jacket in this embodiment of the invention also may be covered by a heat insulating jacket 11ª and this jacket may be covered by a casing 12ª.

In the embodiment of the invention herein shown, the circulating medium is separated from the substance to be treated only by the single thickness of the wall of the cylinder, and the convoluted wall 3ª of the jacket, being united directly to the wall of the cylinder, constitutes, in effect, a fin or extension of such wall, and hence high thermal conductivity between the circulating medium and the substance under treatment is attained. Moreover, the nature of the construction is such that great strength is secured, thereby enabling it to withstand the stresses and strains existing under the actual working conditions of such apparatus, so that leakage of the jacket is not likely to occur.

In the embodiment shown, the important practical advantage is secured that the inside cylinder, the convoluted strip, the surrounding casing and the inlet and outlet connections can be constructed as a unit before the structure is completed, and this unit can be easily and thoroughly tested under pressure for leakage.

The invention secures high thermal efficiency in the interchange of heat between the circulating medium and the substance under treatment, owing to the high thermal conductivity as pointed out above and to the rapid flow of the circulating medium through the relatively narrow convoluted channels of the jacket.

The construction has these advantages and also the strength of a coil, as heretofore used, but it avoids a solder film such as has been found necessary in attaching a coil to the cylinder or receptacle and which reduced materially the thermal conductivity between the coil and the cylinder, the heat according to the present invention being required to pass only through the single-thickness wall of the cylinder, which may be of German silver or other suitable metal of high thermal conductivity, and hence it is unnecessary for the heat to pass through a solder film or joint. Also, the edgewise presentation of the convoluted wall 3ª to the cylinder wall enables the maximum area of the cylinder wall to be exposed directly to the circulating medium.

I claim as my invention:—

1. In apparatus for the interchange of heat, a built-up fluid-tight unitary jacket structure comprising a receptacle to contain the substance to be treated and adapted to have heads applied to the ends thereof, a strip convoluted about the receptacle, and a wall which is spaced from the receptacle and surrounds the receptacle and said strip to form the jacket, the ends of said wall having fluid-tight joints with the peripheral portions of the receptacle, said joints being independent of said heads.

2. In apparatus for the interchange of heat, the combination of a fluid-tight unitary jacket structure comprising a cylinder to contain a substance to be heated or cooled, a relatively flat convoluted wall having its inner circumferential edge presented to and united with the wall of the cylinder and an enclosing wall lying in substantial parallelism with the cylinder wall and bridging the convoluted channels formed between the convolutions of the wall first-mentioned, the ends of the enclosing wall being joined to the respective peripheral end portions of the cylinder, thus forming direct fluid-tight closures for the ends of the jacket, and heads connected to the ends of the cylinder independently of the enclosing wall of the jacket.

In testimony whereof I have hereunto set my hand in presence of two subscribing witnesses.

JOSEPH WILLMANN.

Witnesses:
HENRY E. HAMEL,
EMMA WILLMANN.